United States Patent
Knestel et al.

(10) Patent No.: US 10,288,528 B2
(45) Date of Patent: May 14, 2019

(54) ROAD SURFACE COVERING ELEMENTS FOR A CHASSIS DYNAMOMETER

(71) Applicant: MAHA-AIP GMBH & CO. KG, Haldenwang (DE)

(72) Inventors: Anton Knestel, Hopferbach (DE); Christian Hartmann, Altusried (DE); Thomas Becherer, Dietmannsried (DE)

(73) Assignee: MAHA-AIP GMBH & CO. KG, Haldenwang (DE)

( * ) Notice: Subject to any disclaimer, the term of this patent is extended or adjusted under 35 U.S.C. 154(b) by 944 days.

(21) Appl. No.: 14/394,307

(22) PCT Filed: Apr. 11, 2013

(86) PCT No.: PCT/EP2013/057622
§ 371 (c)(1),
(2) Date: Oct. 14, 2014

(87) PCT Pub. No.: WO2013/153175
PCT Pub. Date: Oct. 17, 2013

(65) Prior Publication Data
US 2015/0125657 A1    May 7, 2015

(30) Foreign Application Priority Data
Apr. 12, 2012   (DE) .................. 10 2012 205 985

(51) Int. Cl.
*G01M 17/007*    (2006.01)
*B22F 3/00*      (2006.01)
(Continued)

(52) U.S. Cl.
CPC ......... *G01M 17/0074* (2013.01); *B22F 3/008* (2013.01); *B22F 3/1055* (2013.01);
(Continued)

(58) Field of Classification Search
CPC ... B33Y 10/00; B29C 64/153; G01M 17/0074
(Continued)

(56) References Cited

U.S. PATENT DOCUMENTS 7,546,765 B1 * 6/2009 Janke ................. G01C 7/04
                                              180/169
2005/0288891 A1   12/2005 Masuyama et al.

FOREIGN PATENT DOCUMENTS

CN    101539663 A     9/2009
DE    101 07 870 A1   9/2002
(Continued)

OTHER PUBLICATIONS

Jun. 26, 2013 International Search Report issued in International Application No. PCT/EP2013/057622.
(Continued)

*Primary Examiner* — Weiping Zhu
(74) *Attorney, Agent, or Firm* — Oliff PLC (57) ABSTRACT

The invention relates to a method for manufacturing road surface covering elements that can be mounted on rollers of chassis dynamometers, including detection of a surface contour of a road surface covering within an essentially strip-shaped section. The method also includes production of a digital image of the detected section and manufacturing of the road surface covering element according to the digital image by means of a three-dimensional manufacturing technique.

13 Claims, 4 Drawing Sheets

(51) Int. Cl.
| | |
|---|---|
| *B22F 3/105* | (2006.01) |
| *B23Q 17/24* | (2006.01) |
| *B23Q 35/00* | (2006.01) |
| *C04B 35/622* | (2006.01) |
| *B29C 64/153* | (2017.01) |
| *B29C 64/386* | (2017.01) |
| *B33Y 50/00* | (2015.01) |
| *B33Y 10/00* | (2015.01) |
| *B33Y 50/02* | (2015.01) |
| *B33Y 80/00* | (2015.01) |

(52) U.S. Cl.
CPC ......... *B23Q 17/2409* (2013.01); *B23Q 35/00* (2013.01); *B29C 64/153* (2017.08); *B29C 64/386* (2017.08); *C04B 35/622* (2013.01); *B22F 2003/1057* (2013.01); *B33Y 10/00* (2014.12); *B33Y 50/00* (2014.12); *B33Y 50/02* (2014.12); *B33Y 80/00* (2014.12); *Y10T 409/303752* (2015.01); *Y10T 428/24355* (2015.01)

(58) Field of Classification Search
USPC ........................................................ 419/53
See application file for complete search history.

(56) References Cited

FOREIGN PATENT DOCUMENTS

| | | |
|---|---|---|
| DE | 10707870 A1 * | 9/2002 |
| DE | 101 41 973 C1 | 4/2003 |
| JP | H09-145551 A | 6/1997 |
| JP | 11218470 A * | 8/1999 |
| JP | H11-218470 A | 8/1999 |

OTHER PUBLICATIONS

Nov. 21, 2013 Office Action issued in German Application No. 102012205985.7.

Jan. 28, 2014 Office Action issued in German Application No. 102012205985.7.

Oct. 14, 2014 International Preliminary Report on Patentability issued in Application No. PCT/EP2013/057622.

English Abstract of German Patent Publication No. DE10107870A1, Sep. 5, 2002.

English Abstract of German Patent Publication No. DE10141973C1, Apr. 17, 2003.

* cited by examiner

ROAD SURFACE COVERING ELEMENTS FOR A CHASSIS DYNAMOMETER

The present invention relates to a method for manufacturing road surface covering elements that can in particular be mounted on rollers of chassis dynamometers.

Road surface covering elements (covering liners) that are mounted on rollers of chassis dynamometers are used for performing acoustic measurements on motor vehicles. Testing for noise is carried out on specific road surface substrates or road surface coverings. The road surface covering elements manufactured according to the invention reproduce every type of road surface or its surface contour with an increased degree of precision and can also be manufactured less laboriously. Another important advantage of the method according to the invention is that it is less laborious to eliminate interference noise sources already during the manufacture of the road surface covering elements.

One interference noise source in particular is the transition between the individual road surface covering elements or more specifically between their (longitudinal) edges. In order to reduce interference noise, it is particularly necessary to avoid non-homogeneous, transitions that are discontinuous (not adapted to one another). Usually, in order to manufacture road surface covering elements, an impression is taken of a real road surface and is then used to produce a casting mold. The casting molds must be embodied as annular or arc-shaped so that the road surface elements can be mounted onto the rollers of the dynamometer. In order to accomplish this, the non-curved, strip-shaped impressions or the casting molds are transformed into an annular or curved shape, with the two end regions of the strip-shaped segment that are oriented in the longitudinal direction being joined together. As a rule, however, the two end regions have different height values and/or a different surface contour so that discontinuities are produced at the transition. The transition then constitutes an interference noise source when a vehicle wheel rolls over the transition repeatedly during the vehicle testing.

DE 101 41 973 C1 has disclosed that road surface covering segments are not manufactured as a representation of a road surface covering that is accurate in every detail. Stones of a predetermined size are embedded in a bonding layer, e.g. plastic, and thus mimic the vertical profile of a road surface covering. This produces a discontinuous transition as described above because at the dividing points of the individual covering liner segments, particularly when larger stones are used, the shape that the stones have by nature significantly complicates the task of adaptation. It is also disadvantageous that this does not achieve a road surface covering reproduction that is true to nature. Furthermore, there can be a reduction of wear resistance when stones come loose.

It is also known, as described above, to manufacture road surface covering segments by taking an impression of a road surface profile, e.g. by means of a modelling clay. The impression is used to produce a casting mold. A plastic is poured into the casting mold and allowed to harden so that the hardened plastic reproduces the road surface covering or more precisely, its profile. The transition between the two end regions of the impression is then manually remodeled before the plastic has completely hardened. The remodeling in particular is a complex activity and is also time-consuming.

The object of the invention is to provide a method that permits a less laborious manufacture of road surface covering elements that optimally reproduce the surface contour of road surface coverings, particularly in order to more effectively avoid interference noise during testing of motor vehicles.

The object is attained by the independent claims. Preferred enhancements of the present invention are described by the dependent claims.

A method according to the invention for manufacturing at least one road surface covering element that can be mounted on rollers of chassis dynamometers can include a detection of a surface contour of a road surface covering (to be reproduced) within an essentially strip-shaped section. The detected strip-shaped section can have a predetermined length in the longitudinal direction and a predetermined width in the transverse direction. In addition, the detected strip-shaped section can be delimited in the longitudinal direction by a longitudinal edge. The method can also include creation of a digital image of the detected section, with vertical values that are in accordance with the surface contour of the road surface covering. The method can also include manufacturing of the road surface covering element according to the digital image by means of a three-dimensional manufacturing technique.

The production or manufacture of at least one road surface covering element should also alternatively include the fact that first in one method, (manufacturing) data are generated that reproduce the road surface covering to be reproduced in such a way that one or more road surface covering elements can be produced based on the manufacturing data. Furthermore, in another method with at least one production step, e.g. a 3D printing and/or a 3D milling, at least one road surface covering element is manufactured—or more specifically, printed or milled—based on the manufacturing data. The manufacturing data preferably includes the data of the image of the detected road surface covering and/or adaptations of the longitudinal edges or end regions of the image. In addition, the manufacturing data can include an annular or arc-shaped image of the detected road surface covering.

The advantages of the method according to the invention are the fact that the manufacture of road surface covering elements (covering liners) is less time-consuming and laborious even when producing a reproduction of a road surface covering to be reproduced that is true to nature. In order to minimize or avoid interference noise when traveling over a transition (region) between the joined longitudinal edges, it is also advantageous that according to the invention, it is possible to carry out an adaptation of the transition (i.e. an adaptation of the two longitudinal edges or end regions of the detected section to each other) can be carried out on the digital image of the road surface covering. The manufacture of road surface covering elements according to the invention can also carried out in a less laborious way because the material production (manufacturing) of road surface covering elements can be carried out by means of a three-dimensional manufacturing technique based on the digital image of the detected road surface covering section.

The term "road surface covering element" (covering liner) refers to an arc-shaped or annular element that is suitable for being mounted on the roller of a chassis dynamometer. A surface that faces outward when the road surface covering element is mounted on the roller reproduces the surface contour of the detected road surface covering. It is known that chassis dynamometers make it possible to test motor vehicles, with the wheels of the motor vehicle to be tested resting on large rollers of a chassis dynamometer. Depending on the type of chassis dynamometer, the rollers can be of different widths and diameters. Preferably, the rollers of a chassis dynamometer have a diameter of up to 2 m. The rollers are up to 2 m wide. In addition, two separate rollers of 1 m each can be provided (next to each other).

The term "surface contour" essentially means the reproduction of a distribution of vertical values across a horizontally positioned, non-curved surface. In other words, the surface contour is produced by the fact that a multitude of points with x and y coordinates within a predetermined area are associated with a vertical value (z value). In the following, the term "x direction" refers to the longitudinal direction of the detected strip-shaped section. The term "y direction" should be understood to mean the transverse direction of the strip-shaped section. The "z direction" is oriented in the direction of the normal to the xy plane.

The term "digital image" should be understood to include any type of digital representation of the detected surface contour of the road surface covering. In particular, these can include representations in the form of tables of z values that are associated with xy points or graphic or pictorial representations. As defined above, a vertical value is a z value in the above-defined xyz coordinate system. The points in the longitudinal and transverse directions, which points can be associated with vertical values, can be defined by means of a position indication, for example of a distance in the longitudinal or transverse direction or by means of xy coordinates.

The term "three-dimensional manufacturing technique" should in particular be understood to include 3D printing methods and/or 3D milling methods.

Also according to the method, an adaptation of the vertical values of the digital image of the two longitudinal edges to each other can take place in that the two vertical profiles can essentially correspond to each other in the transverse direction (transverse profiles) of the two longitudinal edges after the adaptation.

The adaptation of the vertical values in the left and right end region of the detected strip-shaped section or of the outermost transverse profile of the two longitudinal edges preferably takes place digitally and serves to make a transition between the two longitudinal edges as homogeneous as possible when the strip-shaped section is transformed into an annular structure for mounting onto the roller. In other words, no interference noise is produced when the vehicle wheel rolls across the transition.

The method can also include an adaptation of the vertical values of the two longitudinal edges to each other, which can be carried out in such a way that the vertical values of the two longitudinal edges at the same position in the transverse direction can deviate from each other by less than a predetermined deviation value ($\Delta$) after the adaptation.

The expression "at the same position in the transverse direction" means that both positions have the same y value.

The predetermined deviation value is calculated based on the amount of a difference between two vertical values of adjacent points in the longitudinal and/or transverse direction, divided by a comparison vertical value. A maximum predetermined deviation value is present at 50%. This provides sufficient elimination of interference noise sources from the outset. A particularly preferred maximum predetermined deviation value is present at 30% and a very particularly preferred predetermined deviation value is present at less than or equal to 10%. Particularly with a deviation value of less than 10%, the production of interference noise can be suppressed in a particularly effective way.

Because of the adaptation of the vertical values with regard to a predetermined deviation value, it is possible to ensure that the transition between the two longitudinal edges in the assembled state is particularly homogeneous (well adapted) so that interference noise can be eliminated in a particularly effective manner.

In addition, the adaptation of vertical values can be carried out within at least one end region of the digital image which can be delimited on one side by one of the two longitudinal edges. The at least one end region can have a predetermined length starting from the longitudinal edge that laterally delimits the end region.

The expression "end region of the digital image" should be understood to mean that the digital image, like the detected strip-shaped section, is longer than it is wide so that the digital image has a right and left end region that adjoins the two longitudinal edges. The adaptation of the vertical values takes place at least within an end region of the digital image, i.e. in the at least one end region in which the adaptation is carried out, the vertical values are adapted to the vertical values of the other end region. Naturally, it is also possible for the two end regions or more precisely, their vertical values, to be adapted to each other.

The length of the end region in which the vertical values are adapted to one another can be predetermined. Preferably, the length is less than 20% of the total length of the digital image of the detected section. It is particularly preferable for the length to be 10% or less of the total length of the image so that the adaptation is minimally laborious. Basically, the larger the end region is,ns the more optimal a transition is produced by the adaptation, when it comes to the suppression of interference noise. The amount of labor increases, however, with the size of the end region that is adapted.

If not only the (outermost) transverse profiles of the two longitudinal edges, but also the vertical values in an end section with a predetermined length are adapted to each other, it is then possible for the two longitudinal edges to be even more precisely matched to each other at the transition between them so that interference noise can be suppressed in a highly effective manner.

The predetermined length of the at least one end region in which the vertical values are adaptable can be defined (selected, determined) as a function of the number of the maxima of the vertical values in relation to the area of the detected section. In addition, the number of the maxima can also be correlated with a partial area of the detected section. In addition, the predetermined length can also be determined as a function of the number of minima of the vertical values or as a function of a combination of maxima and minima in relation to the total area or a partial area of the detected section. Furthermore, the predetermined length, in addition or alternatively to the dependency on the number of maxima/minima of each (partial) area, can also be determined as a function of (average) slope values of the vertical values in the vicinity around the extreme values (maxima/minima).

Maxima and minima of the vertical values are local extreme values within the area of the detected section. Local extreme values can in particular be easily identified with a graphic representation of the image, for example as the minimum values of a "valley" or maximum values of a "hill" in the graphic representation.

The predetermined length of the at least one end region in which the vertical values are adaptable can be determined as a function of the density of the extreme values. The density of the extreme values is the number of maxima and/or minima divided by the total area of the detected section or divided by a partial area of the detected section. In a preferred embodiment, for example, the number of extreme values within a partial area of an end region of the digital image of the detected section is detected. The partial area can, for example, have a length that is 10% of the total length of the detected section, starting from the longitudinal edge and, for example, can have the width of the detected section. With higher density values, preferably a greater predetermined length of the end region is selected and with lower density values, a shorter predetermined length is selected. For example, with a density of 1, 10, 100, or greater extreme values per $m^2$, the predetermined length can be set to 10% of the total length of the detected strip-shaped section. In addition, for example with a density of greater than 5000 extreme values per $m^2$, the predetermined length can be set to 1% of the total length of the detected strip-shaped section.

Slope values in the region adjacent to the extreme values can be calculated and can additionally or alternatively be used as a basis for determining the predetermined length of the end regions to be adapted. The slope values indicate whether the "hills" or "valleys" of the reproduced road surface covering rise or fall more steeply or more gradually. With gradually rising or falling vertical values, i.e. with low slope values of the vertical values in the vicinity around the extreme values, the predetermined length is preferably selected to be greater, for example 10% of the total length of the detected strip-shaped section. With higher slope values, a shorter predetermined length is selected, for example 1% of the total length of the detected section.

Naturally, the predetermined length of the end regions can also be predetermined in length values, e.g. 1 cm, 10 cm, 25 cm, or greater than 25 cm. It should be noted that in addition, naturally only one of the two end regions of the image is adapted.

An adaptation of the predetermined lengths of the end region in which vertical values can be adapted is advantageous to the extent that an extremely wide variety of road surface coverings or more precisely their surface contours can be processed in as standardized and therefore rapid fashion as possible and their end regions can be adapted to each other. This makes the manufacturing less laborious.

Furthermore, the two longitudinal edges can be digitally assembled so that an annular image of the detected section can be created, with a transition between the two longitudinal edges.

The expression "digital joining of the longitudinal edges" means that with a computer or a similar processing unit, the image of the detected strip-shaped section can be transformed into an annular structure in which the two longitudinal edges of the image of the detected strip-shaped section abut each other and form a transition. The assembly produces an annular image of the detected section.

In this case, it is advantageous that the transformation of the road surface covering to be reproduced from a flat, non-curved surface into a curved structure that can be mounted on a roller of a chassis dynamometer is something that can be achieved without a lot of effort. In particular, for example, it is possible to eliminate the modelling work for manufacturing curved casting molds in conventional methods.

Another advantage of producing a digital annular image is that the length scale extending in the longitudinal direction of the image can be standardized by degree position. In this case, one longitudinal edge can be positioned at 0° and the other longitudinal edge can be positioned at 360°.

The standardization according to the invention has the advantage of achieving an independence from production tolerances in the outer circumference of the rollers of a chassis dynamometer.

The detection of the road surface covering can also be carried out using an optical detection means. The surface contour of the strip-shaped section can be detected and digitized in such a way that a respective vertical value can be determined for each of a predetermined number of points on the strip-shaped section.

The predetermined number of points relates to the number of xy points of the detected section for which a vertical value is detected.

The optical detection means can in particular be a stereo camera (e.g. for performing a light-slit method) or a laser with which vertical values of a surface contour can be detected and associated with xy values (or transverse and longitudinal position values) of the surface.

The predetermined number of points that are detected within the strip-shaped section in order to associate vertical values with them can be predetermined. The greater the predetermined number of points is selected to be, the more precise a depiction of the surface contour of the detected section can be achieved. Preferably, a good imaging precision is achieved if at least 10 points per $cm^2$ are detected. With regard to a good imaging precision, it is more optimal if a higher number of points is detected, e.g. at least 100 points per $cm^2$. Furthermore, the density of points can also be 10,000 points per $cm^2$ or higher.

The detection of the surface contour through the use of an optical detection means is quick, simple, and automatable.

Furthermore, the digital image can be assembled in such a way that the transition at the two longitudinal edges can be placed at the positions 0° or 360° and the detected surface contour can be placed on the outer circumference surface of the annular image.

The road surface covering element can be produced using a three-dimensional printing technique. The road surface covering element can be produced using a three-dimensional milling process. The road surface covering element can be produced using a combination of a three-dimensional printing technique and a three-dimensional milling process. The annular image can be printed and/or milled in one piece.

The annular image (or the printed image in general) can also be printed on supporting plates. The supporting plates can, for example, be made of metal, fiber-reinforced composite, or plastic.

The road surface covering element can also be produced directly on the roller or its roller casing. For example, this can be done using a printing or milling tool that rotates around the roller.

The tool can integrate the road surface covering element (or more precisely the surface contour to be reproduced) in the roller casing of the roller itself or into a cover to be mounted onto the roller casing, e.g. by means of milling, grinding, or the like.

The road surface covering element can also be applied directly to the roller, e.g. by means of a 3D printing technique. It is naturally also possible to use a combined manufacturing method composed of 3D printing and milling, grinding, or abrading.

In addition, for example, the roller can also be rotated during the manufacture directly on the roller while one (or more) 3D manufacturing tool(s) that is/are fixed in position relative to the roller—e.g. a 3D printing tool, a milling tool, a grinding tool, or the like—produces the road surface covering element on the rotating roller.

Manufacturing directly on the roller has the advantage that it is possible to eliminate the usually necessary additional steps of mounting the road surface covering elements onto the roller. Direct manufacturing also ensures an optimal adaptation of the road surface covering element to the surface of the roller, thus ensuring a secure seating of the road surface covering element on the roller. Among other things, this prevents a possible (local) detachment of the road surface covering element from the roller during a test.

The three-dimensional printing technique can in particular include stereo lithography, laser sintering, 3D printing, and fused deposition modeling.

The three-dimensional milling process or milling can, for example, be carried out by means of CNC milling, for example based on CAD data.

The expression "in one piece" means that the annular image can be printed or milled in such a way that the road surface covering element can be in the form of a single piece after manufacturing.

Manufacturing by means of a three-dimensional manufacturing process increases the manufacturing speed and shortens the manufacturing time drastically.

By means of the three-dimensional manufacturing technique, instead of the entire annular image, it is also possible to merely produce one or more arc-shaped road surface covering elements. The annular road surface covering element can then be divided into arc-shaped segments. An arc element with a predetermined arc length of the annular image can be printed and/or milled as an arc-shaped road surface covering element (5a).

The predetermined arc length is in particular defined in relation to the diameter of the rollers and the required number of partial segments. It is thus possible, for example, in a roller with a 1.90 m diameter and 6-8 partial segments for the predetermined arc length of the road surface covering elements to be approx. 0.7 m-1 m.

If a plurality of road surface covering elements are provided per roller, e.g. 6 or 8 of them, then the adaptation of the outer end regions/longitudinal edges according to the invention can be carried out at each transition between two road surface covering elements.

With regard to the manufacture of road surface covering elements, there is an increased manufacturing flexibility since among other things, a complete ring can be produced as a road surface element or a plurality of partial segments of a ring can be produced as road surface covering elements.

In addition, the road surface covering element produced can be composed of plastic, an inorganic material—in particular ceramic, and/or metal.

Basically, all materials that can be used in a three-dimensional manufacturing process are suitable for the production of manufacture of the road surface covering element. Plastic such as ABS, inorganic material such as ceramic, and metal are particularly preferred materials.

Consequently, the road surface covering element can be manufactured with the greatest possible degree of flexibility with regard to the selection of material.

In summary, the method according to the invention makes it possible to manufacture road surface covering elements less laboriously by means of a 3D manufacturing process. It also makes it possible in particular to eliminate interference noise sources in a less laborious fashion.

The invention will be described below by way of example with reference to the accompanying schematic drawings. In the drawings.

Figure 1:
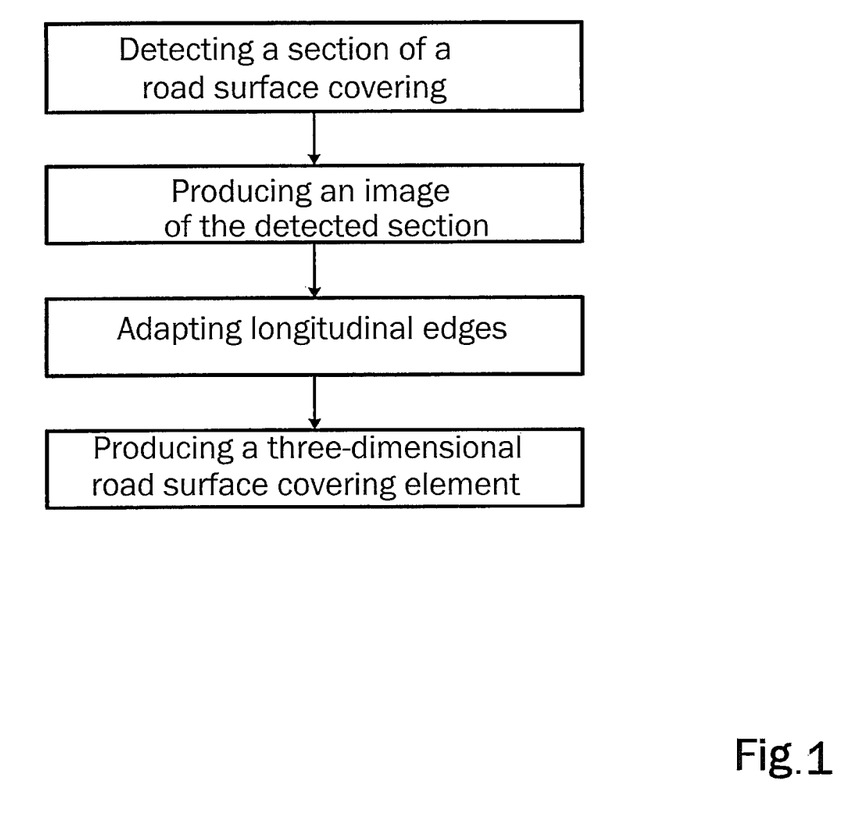
FIG. 1 is a flowchart of an example of the method according to the invention.

FIG. 1 shows a sequence of a manufacturing process according to the invention for road surface covering elements, including the steps: detection of a section 1 of a road surface covering, production of an image 3 of the detected section 1, and production of a (three-dimensional) road surface covering element 5. It can optionally also include adaptation of the longitudinal edges 2a, 2b.

The detection of an essentially strip-shaped section 1 of a road surface covering is carried out by means of an optical detection means 6, for example a laser system or a stereo camera, which travels along a predetermined length L of a section 1 of a road surface covering to be detected and thus a surface contour is detected. For example, the detection takes place by means of scanning, photographing, etc. The predetermined length L of the detected section 1 essentially coincides with the circumference of the rollers $U_R$ of a chassis dynamometer. The detected width B of the detected section 1 of the road surface covering depends on the maximum scannable width, which is predetermined by the optical detection means 6. The predetermined width B of the detected section 1 should essentially coincide with the width $B_R$ of the rollers of a chassis dynamometer. If the maximum detectable width of the optical detection means 6 is less than the predetermined width B of the section 1 to be detected, then the road surface covering to be detected can be detected in a plurality of strip-shaped sections 1, for example one after the other, and then assembled, for example digitally.

The step of the production of a (digital) image 3 of the detected section 1 takes place either integrated with or at the same time as the detection of the section 1, for example by means of a suitable device in the optical detection means 6, or separately. If the step occurs separately, then for example the data of the detected section 1 can be transmitted or sent by the optical detection means 6 to a data processing system (not shown) in which, based on the detected data of the optical detection means 6, the image 3 of the detected section 1 is produced. The image 3 of the detected section 1 is essentially a surface contour or more precisely a vertical value distribution over the area of the detected section 1; in other words, vertical values (z values) of individual points (positions) within the area of the detected section 1 are associated with a particular x/y coordinate (longitudinal/transverse position). In the simplest case, the image 3 of the detected section 1 can be a table or matrix that stores the detected vertical values (z values) for the detected positions/points within the area of the detected section 1. Preferably, the image 3 is a graphic representation of the detected surface contour of the detected section 1, for example an image file or a 3D design file.

Figure 2:
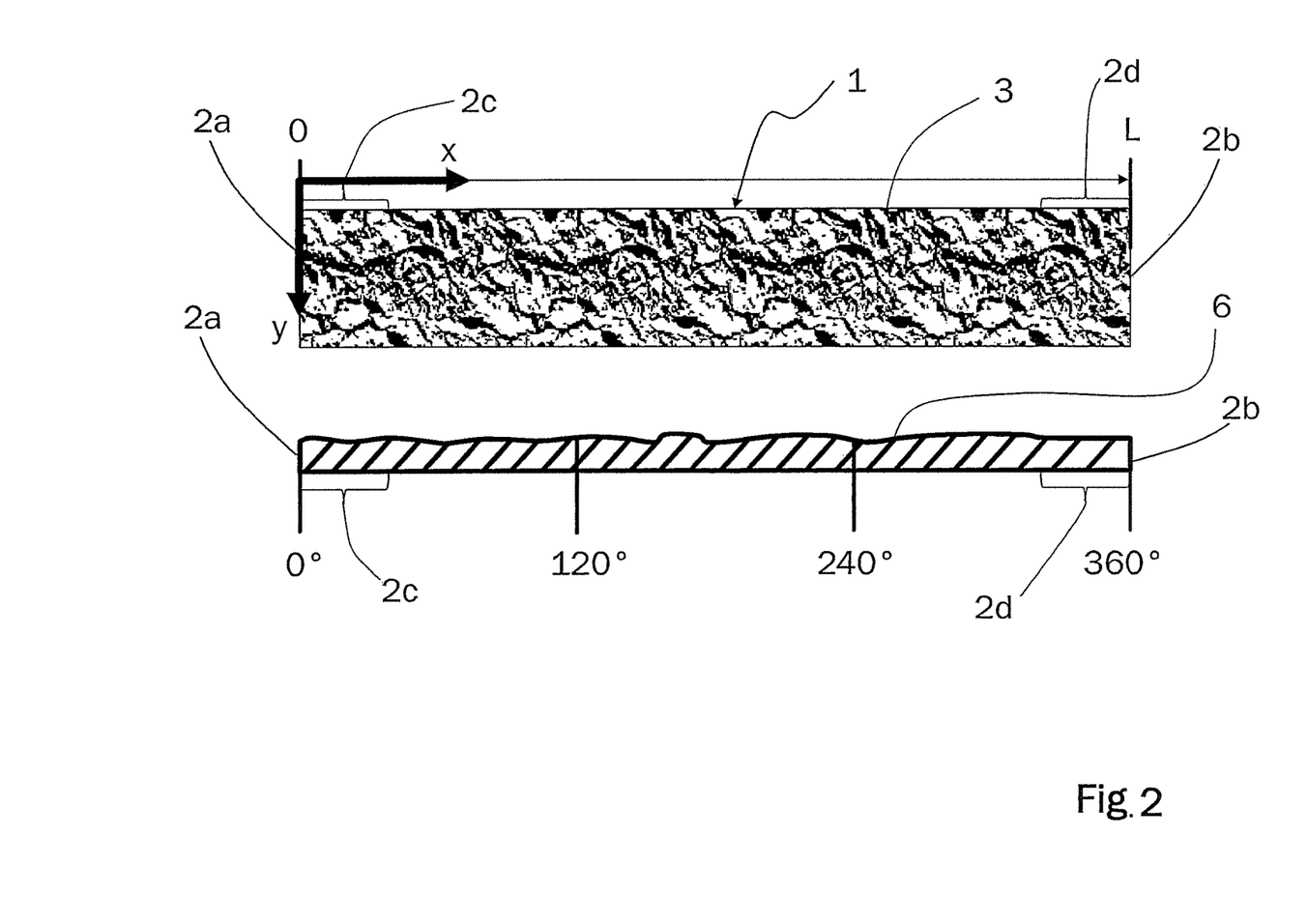
FIG. 2 is a schematic top view of an image and its cross-section.

FIG. 2 shows a very schematic image 3 of the detected section 1. The upper depiction in FIG. 2 shows a top view of the image 3 with a vertical value distribution that is schematically depicted by means of lighter and darker areas or points. The upper depiction in FIG. 2 also shows the x direction, which is oriented in the longitudinal direction of the strip-shaped copy 3, and the y direction, which is oriented in the transverse direction of the image 3. The upper depiction in FIG. 2 also shows that longitudinal edges 2a, 2b delimit the image 3 in the longitudinal direction. The longitudinal edges 2a, 2b are each adjoined by respective end regions 2c, 2d of the image 3 with a predetermined length in the longitudinal direction (−direction). The total length of the image 3 essentially corresponds to the total length of the detected section 1, i.e. the image essentially has the length L. The lower depiction in FIG. 2 is a cross-section (longitudinal profile) of the image 3 at a position that is not further specified in the transverse direction of the image 3. The lower depiction in FIG. 2 also shows an optional standardization by degree position in the longitudinal direction. The value 0° is placed at a (front) longitudinal edge 2a and the value 360° is placed at a (rear) longitudinal edge 2b.

The step of the adaptation of the longitudinal edges 2a, 2b of the image 3 is particularly preferable because the flat, non-curved detected section 1 is transformed into a curved structure. In specific terms, the image 3 is adapted to the radius of the roller. According to the invention, this is achieved in that the two longitudinal edges 2a, 2b are brought together by a curving or bending of the digital image 3. In the simplest case, this is possible, for example, by means of an image processing and/or design program if the image 3 is in graphic form. The bending or curving of the image 3 to the radius of the roller(s) produces a digital annular image 3a. In it, the surface contour of the detected road surface covering is situated on the outer circumference surface of the annular image 3a. Preferably, the two longitudinal edges 2a, 2b are brought together in such a way that the position of a transition 4 between the two longitudinal edges 2a, 2b is situated at 0° or 360°.

The transformation of the strip-shaped section into the curved structure can preferably be carried out in such a way that at first, a volume model is generated from the strip-shaped section. This process is preferably carried out by means of a computer.

In addition, a neutral plane in the z direction can be established, i.e. a zero plane in the z direction is defined. In a particularly preferred embodiment, the zero plane can be selected so that it is oriented along a line of the average roughness of surface contour in the z direction. It is also possible, however, for the zero plane to be oriented along a line of the maximum/minimum height of the profile in the z direction or in between.

If the zero plane has been established, it can define the maximum contour height in the z direction, i.e. the zero plane can constitute the (subsequent) contact surface for the vehicle tires. If the zero plane has been determined, for example, by means of the average contour height/roughness of the surface contour in the z direction, then the contour regions that protrude beyond the zero plane in the z direction can be cut away so that across the entire strip-shaped section, there is a distribution of heights in the z direction that are adapted to one another (made uniform). It should be clarified, however, that the expression "made uniform" as applied to the surface contour does not mean that the contour itself is removed; the expression "made uniform" merely refers to the maxima in the z direction of the surface contour.

The adaptation of the longitudinal edges/end regions to each other preferably occurs after the establishment of the zero plane.

Furthermore, a bottom edge (in the z direction) can be produced for the generated volume model(s) of the strip-shaped section. To accomplish this, a fixed, constant z value can be determined, for example, along which the bottom edge of the volume model(s) extends.

After the above-mentioned steps of the manufacture of a curved structure/a curved volume model (or a plurality of curved volume models), the volume model can be converted from a non-curved structure into a curved one by means of a computer.

If a plurality of road surface covering elements are to be positioned on a roller, then the method explained above can also be modified such that the strip-shaped section is transformed into a volume model and individual segments, e.g. 6-8 pieces for a roller circumference, are cut out, i.e. the section is divided into e.g. 6-8 segments. The other steps of insertion of a zero plane, the adaptation of the longitudinal edges, the adaptation of the bottom edge, and the curving can, as explained above, also be carried out for the plurality of segments/volume models.

Figure 3:
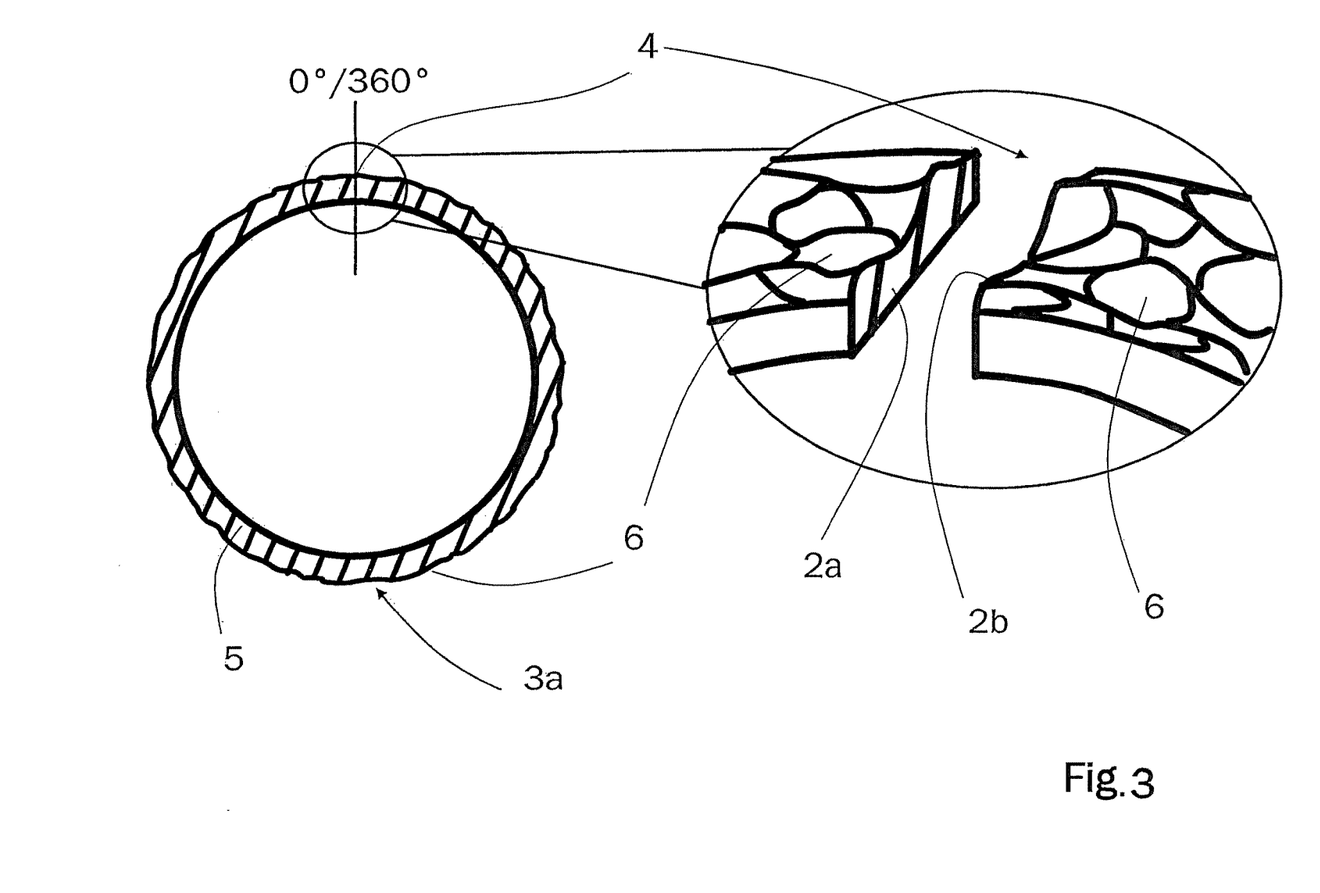
FIG. 3 is a schematic cross-section of a road surface covering element and an enlarged depiction of a transition.

FIG. 3 is a very schematic depiction of the annular image 3. The enlarged detail in FIG. 3 also shows an enlargement of the transition 4 between the two longitudinal edges 2a, 2b. The two longitudinal edges 2a, 2b at the transition 4 are shown spaced apart from each other (in the enlargement in FIG. 3) only for the sake of better visibility. As is also shown in the enlarged depiction in FIG. 3, the transverse profiles (vertical profiles in the transverse direction) of the two longitudinal edges 2a, 2b essentially fit on top of each other; in other words, they (specifically: the vertical values) essentially coincide with one another. The conformity that is shown in FIG. 3 has been produced, for example, by means of a design or graphics program and/or by means of adapting the numerical vertical values. The conformity of the transverse profiles of the two end regions 2a, 2b makes it possible for the transition 4 to produce as little as possible interference noise when a vehicle tire of a motor vehicle being tested rolls over the transition 4. In a particularly preferred embodiment, the end sections 2c, 2d that adjoin the longitudinal edges 2a, 2b (see FIG. 2) are adapted to each other so that the transition 4 even more effectively suppresses interference noise or so that interference noise is avoided.

For the adaptation of the longitudinal edges 2a, 2b and/or end sections 2c, 2d according to the invention, there are several (alternative) possibilities available. A particularly simple method of adaptation includes the fact that the vertical profile in the transverse direction (transverse profile) of the one longitudinal edge 2a, 2b with a negligible depth/length in the longitudinal direction of the image 3 is copied and inserted in place of the other longitudinal edge 2a, 2b, so that the originally detected other longitudinal edge 2b is replaced. For example, the front longitudinal edge 2a is superposed over the rear longitudinal edge 2b and the rear longitudinal edge 2b is thus replaced. Naturally, the reverse is also possible with regard to the front and rear longitudinal edges 2a, 2b. The method makes it possible, when the two longitudinal edges 2a, 2b are brought together to produce the annular image 3a, at least the two profiles of the longitudinal edges 2a, 2b coincide and the adaptation can be carried out rapidly. The copying and replacing can be carried out by means of a graphics program. For example, it is also possible to use the specific numerical vertical values, particularly if the image 3 exists in the form of a data matrix or data table.

In addition, an end section 2c (i.e. its surface contour) can also be copied and inserted in place of the other end section 2d so that the vertical value distribution of the other end section 2d is replaced. By contrast with the method described further above, therefore, not only the (outermost) longitudinal edge 2a, 2b with a negligible depth/length in the longitudinal direction is copied and replaced, but also an (end) section with a defined length in the longitudinal direction. The predetermined length of the end section 2c whose surface contour is being copied can, for example, be determined based on the fact that two positions/points on the two end sections 2c, 2d that are well matched to each other are defined and the end section 2c, 2d to be copied is copied up to this point. This method can also be carried out rapidly and in a non-laborious fashion.

In addition, the surface contours in one of the two end sections $2c$, $2d$ or in both of the end sections $2c$, $2d$ can be adapted, with the surface contour being digitally modified as in the options described above. The predetermined length of the end sections $2c$, $2d$ in which the surface contour is changed can be determined as a function of the number of extreme values (minima and/or maxima) per unit area. In addition or alternatively, slope values that are adjacent to the minima and/or maxima can be used for defining the length of end sections $2c$, $2d$ to be adapted.

A particularly simple method for adapting the surface contour—or more precisely the vertical values—within the end regions $2c$, $2d$ is based on the fact that a user is shown a visual display of the digital image 3 and uses digital graphics applications to adapt the heights and depths of the image 3 within the two end sections $2c$, $2d$ to one another. In the simplest case, this can take place, for example, manually by means of an image processing program. The adaptation can also take place by means of 3D design tools, for example by means of spline adaptation methods or automated adaptation routines that are based on the adaptation possibilities described above.

Preferably, the predetermined length $L_{EB}$ of the end sections $2c$, $2d$ can be essentially 1% of the total length L of the image 3 of the detected section 1, particularly with an extreme value density of greater than 5000 extreme values per m². Preferably, the predetermined length $L_{EB}$ of the end regions $2c$, $2d$ can be 10% of the total length L of the image 3 of the detected section 1 if the extreme value density is less than 5000 extreme values per m². In this context, extreme values refer to local minima and/or maxima.

In addition, the adaptation of the longitudinal edges $2a$, $2b$ and/or of the end sections $2c$, $2d$ can also be carried out by means of a predetermined deviation value Δ. The deviation value Δ is mathematically calculated based on the quotient of a difference between two vertical values that can be situated adjacent to each other and one of the two vertical values of the difference. With vertical values that are directly adjacent, a very small deviation value Δ is preferred, e.g. less than 1% or less than 5%. This achieves a transition 4 with very good adaptation between the adjoining parts. With vertical values that are not directly adjacent or with less restrictive requirements on the adaptation, the deviation value Δ can also be up to 50%.

In the adaptation, naturally only one of the two end regions $2c$, $2d$ can be adapted to the respective other end region $2c$, $2d$ or both end regions $2c$, $2d$ together can be adapted to each other.

The step of manufacturing the road surface covering element 5 by means of a 3D printing method and/or 3D milling method includes the fact that the digital image 3 or the annular image $3a$ is produced by means of a suitable 3D printing and/or milling device. 3D printing methods are essentially based on the fact that the three-dimensional image 3 is built up in layers. Depending on the method, the layer thickness can lie between a few micrometers and approx. ¼ mm. The layer thickness influences the vertical resolution, with a thicker layer thickness resulting in a lower resolution.

Three-dimensional manufacturing by means of stereolithography in particular produces very smooth surfaces of the three-dimensional road surface covering element 5. The road surface covering element 5 is produced in a basin that is filled with (preferably) liquid synthetic resin and a UV laser periodically hardens the synthetic resin. The hardening is carried out in layers. Overhanging, hardened components of the road surface covering element 5 do not support themselves so that a support structure of another material must be created, which is removed after the road surface covering element 5 is manufactured. Advantageously, stereolithography can also make use of transparent material.

Both plastics and metal can be processed using laser sintering. In laser sintering, a pusher distributes the raw material in powdered form in the predetermined layer thickness on a printing table. Then a laser hardens the powder at the predetermined points by heating it. The process is repeated until the road surface covering element 5 is completely formed. Protruding parts can also be manufactured without a second supporting material. The often rough surface that is produced with laser sintering can be smoothed out by means of a plastic coating.

Road surface covering elements 5 can also be manufactured using a 3D printer that uses a combination of laser sintering and two-dimensional printing with an inkjet printer. The print head, which can also distribute various colors of ink, dispenses ink onto a thin layer of gypsum-like powder; a bonding agent that is mixed in with the ink allows the printed areas to harden. It is thus possible to produce the road surface covering element 5 layer by layer. The finished road surface covering element 5 can be impregnated with synthetic resin in order to achieve an additional stability and/or to improve surface quality.

Road surface covering elements 5 can also be manufactured using the particularly simple and economical-to-implement fused deposition modeling method in which a melted plastic is sprayed from a nozzle so that the desired form of the road surface covering element 5 is drawn in layers with a strip of soft plastic. In a particularly preferred embodiment, ABS plastic is used for this.

All of these 3D manufacturing processes advantageously permit a rapid manufacture of the road surface covering elements 5 with a very precisely detailed reproduction of the surface contour of the road surface covering.

It is also possible to manufacture the road surface covering element 5 by means of a CNC milling cutter, which mills the three-dimensional road surface covering element 5 from a blank preferably made of metal or ceramic. To accomplish this, it is particularly preferable for the image 3—or more precisely the annular image $3a$—to be in the form of a CAD file. In 3D milling, it is advantageous for the road surface covering element 5 to be milled out of a single blank so that very favorable strength values of the road surface covering element 5 are achieved.

Figure 4:
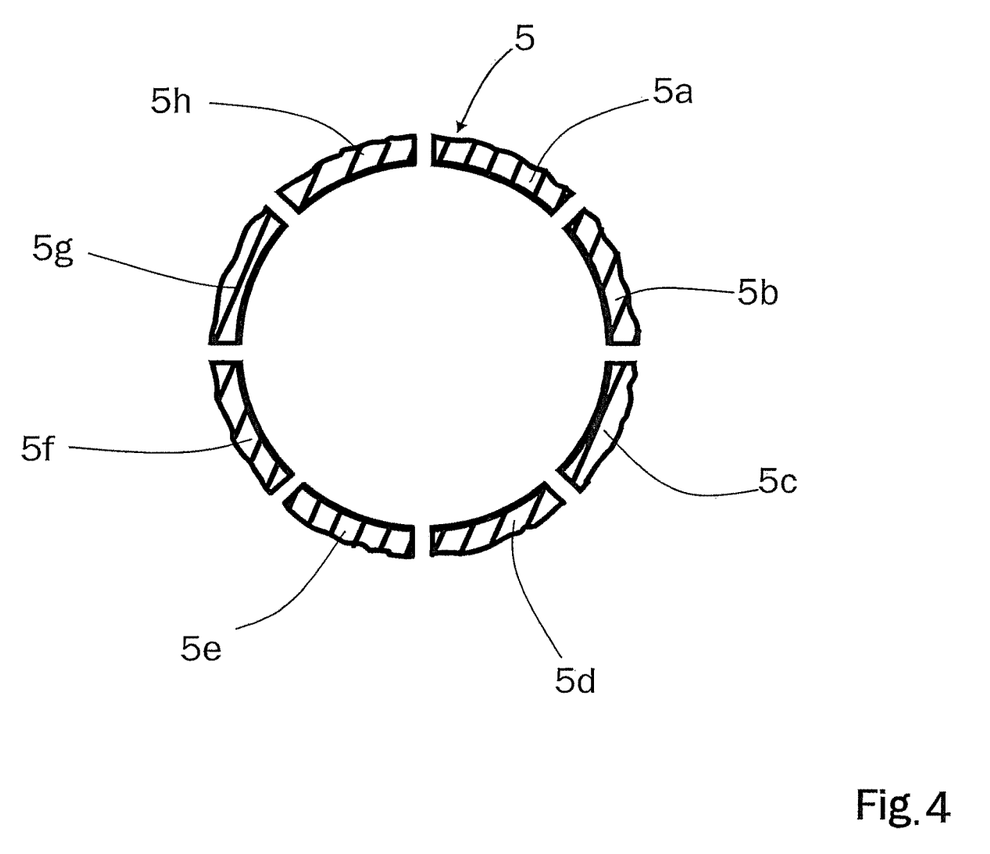
FIG. 4 is a schematic cross-section of a road surface covering element that has been divided into a plurality of elements/segments.

As shown in FIG. 3, the 3D manufacturing process can be used to print the annular image $3a$ in one piece or, as shown in FIG. 4, to print individual arc segments $5a$ through $5h$. In addition, the annular image $3a$ can also be printed in one piece and then divided. To accomplish this, for example predetermined breaking points can also be produced in the printing process or else the division can be carried out, for example, by sawing or other cutting techniques.

In summary, the method according to the invention makes it possible to rapidly and precisely manufacture an exact reproduction of a surface contour of a road surface covering in the form of a road surface covering element 5 for rollers of chassis dynamometers. The adaptation of the transition 4 between the two longitudinal edges $2a$, $2b$ or end sections $2c$, $2d$ can be carried out with very little work and interference noise that is produced particularly when rolling over a non-adapted transition 4 can be optimally reduced.

1 strip-shaped section of a road surface covering
2a front longitudinal edge of the detected section 2b rear longitudinal edge of the detected section
2c front end section of the detected section
2d rear end section of the detected section
3 image of the detected section
3a annular image
4 transition
5, 5a, 5b, . . . road surface covering segment(s)
6 optical detection means
L length of the detected road surface covering section
B width of the detected road surface covering section
$U_R$ circumference of the rollers of a chassis dynamometer
$B_R$ width of the rollers of a chassis dynamometer
$L_{EB}$ length of the end region
Δ predetermined deviation value

The invention claimed is:

1. A method for manufacturing road surface covering elements that can be mounted on rollers of chassis dynamometers, including:
   generating manufacturing data for producing a digital image of a strip-shaped section with vertical values in accordance with the surface contour of a road surface, and
   manufacturing the road surface covering element according to the digital image by means of a three-dimensional manufacturing technique,
   wherein:
   the digital image of the strip-shaped section has a predetermined length in the longitudinal direction and a predetermined width in the transverse direction, and is delimited in the longitudinal direction by a respective longitudinal edge,
   a digital representation of the surface contour is produced by associating a multitude of points with coordinates in the longitudinal direction of the strip-shaped section and coordinates in the transverse direction of the strip-shaped section within the digital image with a vertical value and
   the vertical values of the digital representation of the surface contour along the two longitudinal edges of the digital image are adapted to each other in such a way that the vertical values of the digital image of the two longitudinal edges at the same position in the transverse direction differ from each other by less than a predetermined deviation value after the adaptation.

2. The method according to claim 1, wherein the adaptation of the vertical values is carried out within at least one end region of the digital image, which is delimited on one side by one of the two longitudinal edges, and the at least one end region has a predetermined length in the longitudinal direction starting from the longitudinal edge that laterally delimits the end region.

3. The method according to claim 2, wherein the predetermined length of the at least one end region in which the vertical values are adapted is determined as a function of the number of maxima and/or minima of the vertical values in relation to the area or partial area of the digital image of the strip-shaped section and/or the predetermined length is determined as a function of average slope values of the vertical values that are situated in the vicinity of the maxima and/or minima.

4. The method according to claim 1, wherein the two longitudinal edges are digitally assembled so that an annular image of the strip-shaped section is produced, with a transition between the two longitudinal edges.

5. The method according to claim 4, wherein the digital image is assembled in such a way that the transition at the two longitudinal edges is positioned at 0° or 360° and the surface contour is situated on the outer circumference surface of the annular image.

6. The method according to claim 4, wherein the manufacturing of the road surface covering element is carried out by means of a three-dimensional printing technique and/or by means of a three-dimensional milling process and an entirety of the annular image is printed and/or milled in one piece.

7. The method according to claim 4, wherein the manufacturing of the road surface covering element is carried out by means of a three-dimensional printing technique and/or by means of a three-dimensional milling process and an arc element with a predetermined arc length of the annular image is printed and/or milled as an arc-shaped road surface covering element.

8. The method according to claim 4, wherein an entirety of the annular image is printed and/or milled in one piece and the annular road surface covering element is then divided into arc segments.

9. The method according to claim 1, wherein a length scale extending in the longitudinal direction of the digital image is standardized by degree position in such a way that the one longitudinal edge is positioned at 0° and the other longitudinal edge is positioned at 360°.

10. The method according to claim 1, wherein the manufacturing data is generated by detecting a surface contour of a strip-shaped section of a road surface covering using an optical detection means, and the surface contour of the strip-shaped section is detected and digitized in such a way that a respective vertical value is determined for each of a predetermined number of points on the strip-shaped section.

11. The method according to claim 1, wherein the manufactured road surface covering element is composed of plastic or an inorganic material.

12. The method according to claim 11, wherein the inorganic material is ceramic or metal.

13. The method according to claim 1, wherein the road surface covering element is produced directly on the roller.

* * * * *